G. WATT.

Plow.

No. 506. Reissued Nov. 10, 1857.

N. PETERS, Photo-Lithographer, Washington, D. C.

UNITED STATES PATENT OFFICE.

GEORGE WATT, OF RICHMOND, VIRGINIA.

IMPROVEMENT IN PLOWS.

Specification forming part of Letters Patent No. 16,218 dated December 9, 1856; Reissue No. 506, dated November 10, 1857.

*To all whom it may concern:*

Be it known that I, GEORGE WATT, of the city of Richmond, in the county of Henrico and State of Virginia, have invented certain new and useful Improvements in Plows; and I do hereby declare that the following is a full, clear, and exact description thereof, reference being had to the accompanying drawings, in which—

Figure 1:
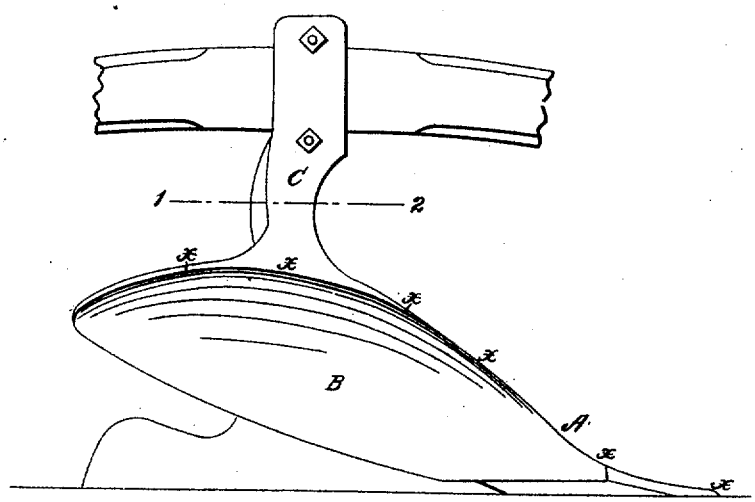
Figure 2:
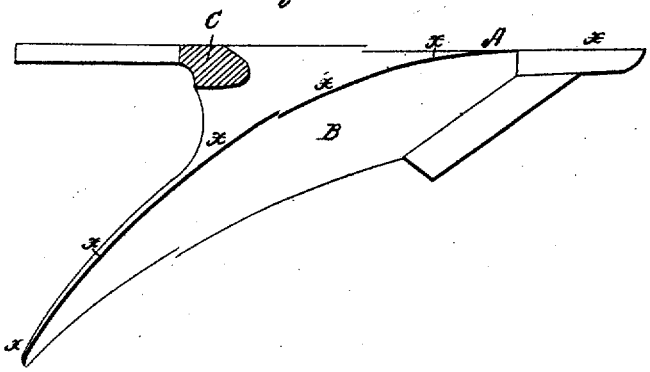

Figure 1 represents an elevation of a plow, and Fig. 2 a section of the same in the line 1 2.

The letters of reference indicate like parts in the different figures.

The nature of my improvement consists in forming the breast of a plow in the manner hereinafter described, by which weeds and rubbish are readily conducted off.

At the point A, or thereabout, the mold-board commences to turn over the soil. From this point the upper edge of the mold-board B inclines toward the turned furrow, as shown in Fig. 2, the curve continuing to the tail of the mold-board.

The standard C is cast in the same piece as the mold-board, and presents a rounded form in front. It is curved forward and toward the mold-board, its surface intersecting the surface of the mold-board at an angle gradually increasing from the point A to the rear of the standard C.

Plows of the usual construction, in which the edge of the mold-board or breast of the plow is carried up to the beam, are liable to be choked or obstructed in foul ground by accumulations of weeds, stubble, &c.; but with my improvement, the edge being gradually curved away from the standard and the latter presenting no acute angle in front, the weeds, &c., slide off with facility.

Having thus fully described my improvement, what I claim as my invention, and desire to secure by Letters Patent, is—

The curved standard with its front or concave side rounded off, and its curved surface extended to intersect the mold-board along its upper edge, *x x x*, substantially as and for the purposes set forth.

In testimony whereof I have hereunto signed my name before two subscribing witnesses.

GEO. WATT.

Witnesses:
WM. S. SUMNER,
G. W. DYER.